Oct. 18, 1949.    R. H. WENDT    2,485,521
SPATULA
Filed Oct. 27, 1948
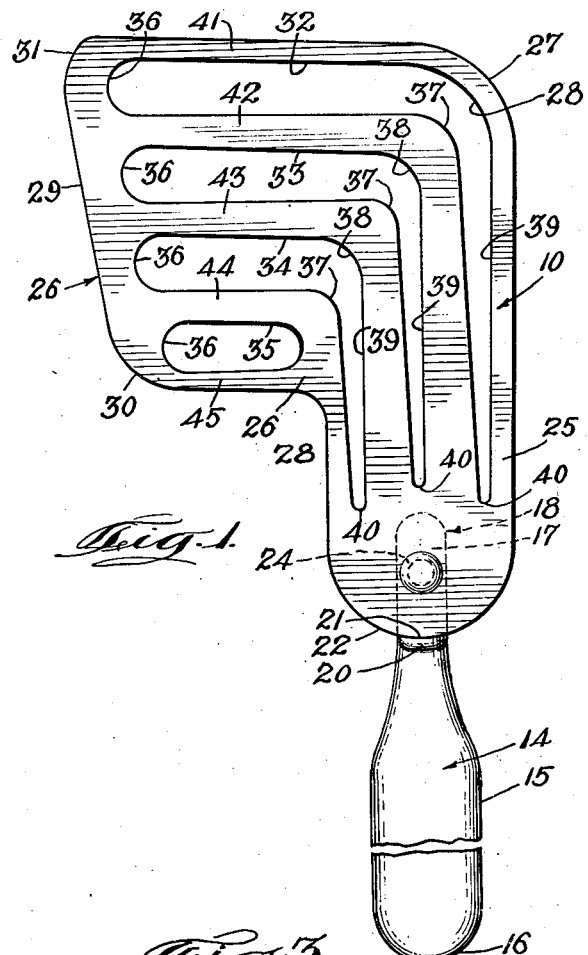
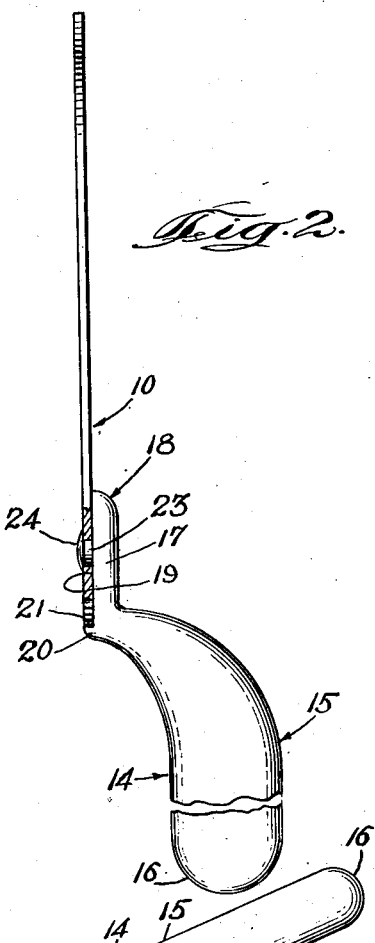
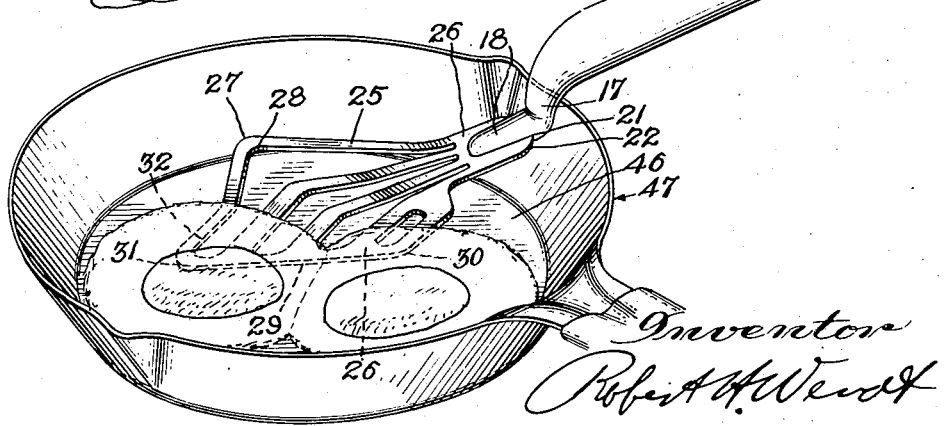
Inventor
Robert H. Wendt Patented Oct. 18, 1949

2,485,521

UNITED STATES PATENT OFFICE 2,485,521

SPATULA

Robert H. Wendt, Evanston, Ill.

Application October 27, 1948, Serial No. 56,841

5 Claims. (Cl. 294—7)

1

The present invention relates to spatulas of the type used for turning pancakes, eggs, and the like.

With the elongated flexible spatulas of the prior art, when the user desires to insert the point of the spatula beneath the pancake or egg, this requires a sharp down turn of the wrist, which involves an unusual movement that is uncomfortable to most users.

One of the objects of the present invention is the provision of an improved spatula which is so constructed that it may have its point and its body inserted between a pancake or egg and the griddle or frying pan by a mere turn of the wrist instead of involving the sharp downward curve of the wrist, as is required by the devices of the prior art.

Another object is the provision of an improved spatula of the class described, which is so constructed that by means of a twist and pressure its laterally projecting portion may be easily insinuated between the pancake or egg and the griddle and so that these may be lifted and adequately supported for turning, without lifting a large amount of grease.

Another object of the invention is the provision of an improved spatula which is durable, capable of economical construction, extremely flexible, and adapted to be used with the greatest of ease in separating fried products from the griddle or frying pan.

Other objects and advantages of the invention will be apparent from the following description and the accompanying drawings, in which similar characters of reference indicate similar parts throughout the several views.

Referring to the single sheet of drawings accompanying the specification,

Fig. 1 is a fragmentary top plan view of a spatula embodying my invention;

Fig. 2 is a side elevational view;

Fig. 3 is a view in perspective, showing how the spatula may be inserted between an egg and a griddle by merely turning the wrist instead of sharply bending the wrist downward, as with the devices of the prior art.

Referring to Fig. 1, the present spatula preferably includes a flat, flexible and resilient body member 10 of sheet metal, such as resilient stainless steel and a handle member 14, which is preferably formed of one of the light metals, such as aluminum or an aluminum alloy, by casting.

The handle comprises an elongated cylindrical body 15 formed with a partially circular end 16 and with a tapered offset at 17. The tapered offset 17 has a laterally projecting attaching flange 18, which may be partially cylindrical on

2 its upper side, and which has a plane lower side 19. The offset 17 has a depending lug 20, which extends below the plane surface 19, and has an annular shoulder 21, which is curved, as shown in Fig. 1, for engaging the curved end 22 of the flexible body 10.

An integral cylindrical riveted body 23 may be formed on the attaching flange 18 so that it may extend through a punched bore 24 in the flexible body 10 and riveted over to secure the handle to the flexible body. The handle being made by casting out of a light metal alloy, it can be secured to the flat body 10 by the single rivet because the curved edge 22 engages the curved shoulder 21, preventing rotation of the handle on this integral rivet 23.

The flat body 10 preferably consists of a longitudinally extending narrow portion 25 and a laterally extending wider portion 26. The laterally extending portion 26 preferably extends at substantially a right angle to the narrow body portion 25; but the corners, indicated at 27 on the outer corner, and 28 at the inner corner, are preferably rounded, and are partially circular.

The spatula shown is a right hand tool, but they may be made for left handed persons also by locating portion 26 toward the right side, instead of being on the left side as shown.

The rear end of the body portion 25 is partially circular at 22, and the outer end of the wider portion 26 is indicated at 29. This is preferably formed on a bevel extending from the rounded corner 30 diagonally upward and to the left and to the rounded point 31, which is the point that is first inserted beneath the egg, pancake, or other food.

The material of which the resilient body 10 is made is preferably quite thin; and its resiliency is great so that it will always return to its original plane condition. In order to increase the flexibility and to permit the larger body portion 26 to be laid down flatly in the pan or griddle, I prefer to reduce the body portion by providing a plurality of slots or elongated apertures 32, 33, 34, 35.

These slots 32 to 35 are all preferably provided at their ends with rounded or partially circular edges, indicated at 36, at the left end of the apertures. The elongated apertures 32 to 35 are preferably tapered toward the handle; and since the body portion 26 is wider than the body portion 25, the elongated aperture 35 extends only horizontally in Fig. 1.

The other tapered apertures 32 to 34 are angular in plan as shown in Fig. 1, and are formed with an angular bend defined by the outwardly rounded edges 37 and by the inwardly rounded edges 38. From the angular bend in each aperture the apertures have the tapered portions 39 terminating close to the point of attachment of the handle 14 in a rounded edge portion 40 at the end of each aperture.

The elongated apertures 32—35 leave only a plurality of narrow strips 41—45 in the wide body portion 26; and this makes the spatula so flexible that by means of twisting, and exerting a downward pressure, the portion 26 may be laid down flatly on the bottom 46 of the frying pan 47, while the narrow portion 25 is slightly elevated from the bottom of the pan.

Thus the point 31 of the spatula may be inserted under an egg or pancake and above the griddle by a mere turn of the wrist, which is a more natural movement for all users, and one which involves no discomfort. It is not necessary to bend the wrist down sharply to point the end of the spatula down, as the offset 17 locates the body of the spatula down in the frying pan, while the point 31 is being inserted below the egg or pancake.

This offset 17 is so used because with the present spatula the food is attacked from the side which is toward the right of the user instead of the side which is toward the front of the user.

It will thus be observed that I have invented an improved spatula for use in turning eggs, pancakes, or the like, or for loosening food on a griddle, which is more easily operated than the devices of the prior art, and which involves a natural twisting movement that is not uncomfortable.

The present device is, therefore, easier to use; and its structure makes it more handy than any of the devices of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a spatula for handling food products on a griddle, the combination of a handle having a grip portion, a downward offset, and an attaching flange with a flexible sheet metal, resilient plane body secured to said attaching flange, said body including two portions at right angles to each other, with the handle secured to the end of one portion, the end of the other portion being insertable beneath the food, by twisting the wrist, and pressing downwardly and moving laterally, the said body being formed with a plurality of elongated apertures extending from its free advancing edge to the portion attached to the handle, to reduce the cross-sectional area of the remaining portions and to increase their flexibility so that the twisting and pressure may place the laterally projecting free end portion flatly on the griddle.

2. In a spatula for handling food products on a griddle, the combination of a handle having a grip portion, a downward offset, and an attaching flange with a flexible sheet metal, resilient plane body secured to said attaching flange, said body including two portions at right angles to each other, with the handle secured to the end of one portion, the end of the other portion being insertable beneath the food, by twisting the wrist, and pressing downwardly and moving laterally, the said body being formed with a plurality of elongated apertures extending from its free advancing edge to the portion attached to the handle, to reduce the cross-sectional area of the remaining portions and to increase their flexibility so that the twisting and pressure may place the laterally projecting free end portion flatly on the griddle, the said apertures being tapered toward the handle so that the stiffness of the body portion increases toward the handle.

3. In a spatula for handling food products on a griddle, the combination of a handle having a grip portion, a downward offset, and an attaching flange with a flexible sheet metal, resilient plane body secured to said attaching flange, said body including two portions at right angles to each other, with the handle secured to the end of one portion, the end of the other portion being insertable beneath the food, by twisting the wrist, and pressing downwardly and moving laterally, the said body being formed with a plurality of elongated apertures extending from its free advancing edge to the portion attached to the handle, to reduce the cross-sectional area of the remaining portions and to increase their flexibility so that the twisting and pressure may place the laterally projecting free end portion flatly on the griddle, the said apertures being tapered toward the handle so that the stiffness of the body portion increases toward the handle, the free edge of the laterally projecting portion being beveled outwardly toward the corner most remote from the handle, which is in position to be inserted first beneath the food and above the griddle.

4. In a spatula for handling food products on a griddle, the combination of a handle having a grip portion, a downward offset, and an attaching flange with a flexible sheet metal, resilient plane body secured to said attaching flange, said body including two portions at right angles to each other, with the handle secured to the end of one portion, the end of the other portion being insertable beneath the food, by twisting the wrist, and pressing downwardly and moving laterally, the free end of the said other portion being beveled outwardly away from the handle to form the end of the body remote from the handle with a point bounded by edges at an acute angle to each other.

5. In a spatula for handling food products on a griddle, the combination of a handle having a grip portion, a downward offset, and an attaching flange with a flexible sheet metal, resilient plane body secured to said attaching flange, said body including two portions extending transversely to each other, with the handle secured to the end of one portion, the end of the other portion being insertable beneath the food, by twisting the wrist, and pressing downwardly and moving laterally.

ROBERT H. WENDT.

REFERENCES CITED

The following references are of record in the file of this patent:

UNITED STATES PATENTS

| Number | Name | Date |
|---|---|---|
| 725,628 | Ressler | Apr. 14, 1903 |
| 1,432,412 | Rietveld | Oct. 17, 1922 |
| 1,815,850 | Klipstein | July 21, 1931 |
| 2,063,432 | Greene et al. | Dec. 8, 1936 |
| 2,137,458 | Phelps | Nov. 22, 1938 |
| 2,357,764 | Raymond | Sept. 5, 1944 |